(12) United States Patent
Allen

(10) Patent No.: US 12,038,577 B2
(45) Date of Patent: Jul. 16, 2024

(54) VARIABLE FOCUS AND REFLECTIVITY MIXED AUGMENTED REALITY SYSTEM

(71) Applicant: Nine Nine Technology, San Diego, CA (US)

(72) Inventor: Alexandria M. Allen, San Diego, CA (US)

(*) Notice: Subject to any disclaimer, the term of this patent is extended or adjusted under 35 U.S.C. 154(b) by 402 days.

(21) Appl. No.: 16/805,281

(22) Filed: Feb. 28, 2020

(65) Prior Publication Data
US 2020/0301134 A1    Sep. 24, 2020

Related U.S. Application Data

(60) Provisional application No. 62/812,204, filed on Feb. 28, 2019.

(51) Int. Cl.
| | |
|---|---|
| *G02B 27/00* | (2006.01) |
| *G02B 27/01* | (2006.01) |
| *G02B 27/09* | (2006.01) |
| *G06T 19/00* | (2011.01) |

(52) U.S. Cl.
CPC ..... *G02B 27/0075* (2013.01); *G02B 27/0093* (2013.01); *G02B 27/0972* (2013.01); *G06T 19/006* (2013.01); *G02B 2027/0127* (2013.01); *G02B 2027/0138* (2013.01)

(58) Field of Classification Search
CPC ............ G02B 27/0075; G02B 27/0093; G02B 27/0972; G02B 2027/0127; G02B 2027/0138; G02B 3/14; G02B 2027/0185; G02B 27/0172; G06T 19/006
See application file for complete search history.

(56) References Cited

U.S. PATENT DOCUMENTS

| | | | |
|---|---|---|---|
| 10,319,154 B1* | 6/2019 | Chakravarthula | .... G06T 19/006 |
| 2017/0242250 A1* | 8/2017 | Border | ................ G02B 5/201 |
| 2018/0356639 A1* | 12/2018 | Schaefer | .................. G02F 1/29 |

OTHER PUBLICATIONS

P. Chakravarthula, D. Dunn, K. Akşit and H. Fuchs, FocusAR: Auto-focus Augmented Reality Eyeglasses for both Real World and Virtual Imagery, Nov. 2018, in IEEE Transactions on Visualization and Computer Graphics, vol. 24, No. 11, pp. 2906-2916. (Year: 2018).*

S. Liu, H. Hua and D. Cheng, A Novel Prototype for an Optical See-Through Head-Mounted Display with Addressable Focus Cues, May-Jun. 2010, in IEEE Transactions on Visualization and Computer Graphics, vol. 16, No. 3, pp. 381-393. (Year: 2010).*

* cited by examiner

*Primary Examiner* — Jeffery A Brier
(74) *Attorney, Agent, or Firm* — Buche & Associates, P.C.; John K. Buche; Bryce A. Johnson (57) ABSTRACT

A mixed reality system and a method of using the mixed reality system to adjust or vary the focus of virtual content and virtual objects as a user's eye varies its focal point, resulting in a perceptually consistent focus or a perceptual match to the focus of objects in the real world. The mixed reality system is designed to optimize the definition of virtual objects without compromising the focus on reality.

17 Claims, 12 Drawing Sheets

VARIABLE FOCUS AND REFLECTIVITY MIXED AUGMENTED REALITY SYSTEM

CROSS-REFERENCE TO RELATED APPLICATIONS

The present application claims priority to U.S. Provisional Patent Application No. 62/812,204, filed on Feb. 28, 2019, and entitled, "Variable Focus and Reflectivity Mixed Augmented Reality System," the entire disclosure of which is incorporated by reference herein.

BACKGROUND OF THE INVENTION

1. Field of Invention

This invention relates to mixed reality systems and more specifically, to a mixed augmented reality system with configurable components to achieve simultaneous focus of the real world and virtual objects with variable depth in real space.

2. Description of Related Art

Often the concepts behind virtual reality and augmented reality systems are mistakenly used interchangeably, which contributes to confusion about a user's experience. Augmented reality (AR) adds digital elements to a live view often by using a camera on a smart device. Examples of AR experiences include Snapchat lenses and the game Pokémon Go. Virtual reality (VR) implies a complete immersive experience that shuts out the actual physical world and replaces it with a digital environment. Using VR devices such as HTC Vive, Oculus Rift, or Google Cardboard, users can be transported into a number of synthesized life-like or imagined environments such as the depths of the sea or the belly of a whale. In a mixed AR or mixed reality experience, which combines elements of both AR and VR, real-world and digital objects interact.

The most popular reality altering devices on the market are VR devices. Many consumers have adopted VR devices for entertainment and video gaming. Many software applications have been created for use in various industries including, but not limited to, architecture, automotive, sports training, real estate, mental health, medicine, health care, retail, space travel, design, engineering, interior design, television, film, media, advertising, marketing, libraries, education, news, music, and travel.

Currently, the majority of applications that exist in the AR technology space are targeted toward handheld devices such as smartphones and tablets. This is because most consumers already own one or more handheld devices, so there is minimal drive for developers to target auxiliary AR devices. Unfortunately, this means consumers are not driven to purchase AR headsets. To encourage consumer interest in AR, there is a need for a mixed reality system that can bridge the gap between existing VR applications and new AR applications.

State-of-the art mixed reality systems fail to provide a solution that enables the simultaneous focus of the real world and virtual objects as a user's eye varies its focal length. This is a core problem in the mixed reality field. The eye naturally changes focus as it locks on a real object in the physical world. This means that, in mixed reality, the digital or virtual objects need to occupy three-dimensional (3D) space, but they also need to share the perceived "integrated" space with real objects. Hence, there is a need for mixed reality systems that improve the perceived integration of virtual objects in the real world.

SUMMARY OF THE INVENTION

The present invention overcomes these and other deficiencies of the prior art by providing a mixed reality system that solves the integration problem by modifying the focus of digital objects to be perceptually consistent or a perceptual match with the focus of the real objects as a user's eye varies its focal point for objects with different depths. The invention provides solutions regarding (1) how to convince a user's mind to perceive a near-eye digital object at varying real-world depths from within arms-reach to optical infinity in the real world and (2) how to create an integrated perception of a variable focus digital object with real-world objects without compromising the perceived "solidity" of either space.

In a certain embodiment, a mixed AR system includes a display which has pixel-by-pixel control of the viewscape. As such, fully obscuring the viewscape gives the technology the ability to act as a VR optics platform as well as an AR platform.

The present invention provides a cost-effective and improved mixed AR system for simultaneous focus of virtual objects in the real world as the depth of both virtual and real objects vary.

Aspects of the present invention relate to apparatuses for and methods of using a mixed reality system.

These and other systems, methods, objects, features, and advantages of the present invention will be apparent to those skilled in the art from the following detailed description of the preferred embodiments and the drawings. All documents mentioned herein are hereby incorporated in their entirety by reference.

The foregoing, and other features and advantages of the invention, will be apparent from the following, more particularized description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIG. 1-12, wherein like reference numerals refer to like elements.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, dimensions, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1A:
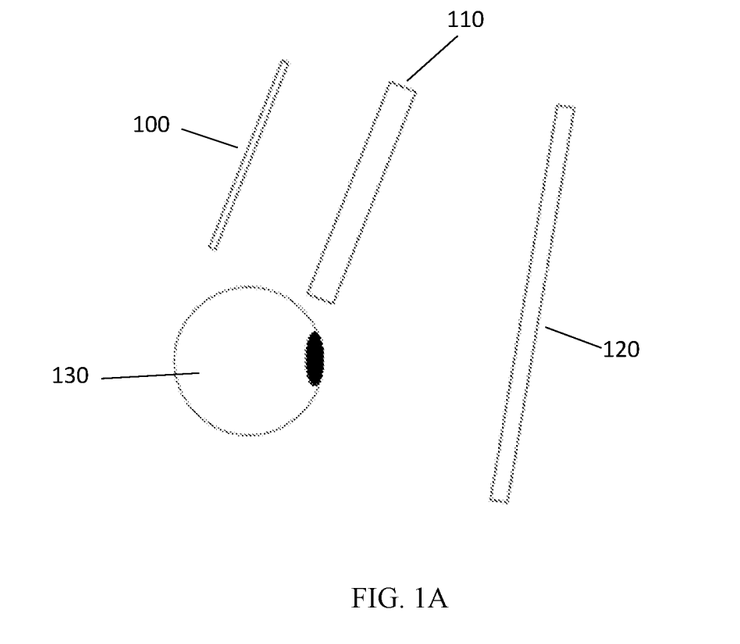
FIG. 1A illustrates a perspective view of a mixed reality system in a configuration according to one embodiment of the invention.

FIG. 1A shows a perspective view of a mixed reality system comprising a display 100 positioned relative to a user's eye 130, a variable focus lens 110 positioned at the exit pupil of the display 100, and a visual combiner 120 positioned in front of a user's eye 130. The invention is a mixed AR system designed to optimize definition of virtual objects without compromising the focus on real physical space.

In certain examples of the invention, the display function comprises novel features. In particular, the display 100 presents a digital image through at least one variable focus lens 110 that reflects contents of the digital image off of the visual combiner 120 into the user's eye 130. One or more variable focus lenses 110 will condense the rays of the digital image allowing the mixed AR system to control the perceived depth of the virtual object. The visual combiner 120 will allow the mixed AR system to control the viewable space to pass through real objects and reflect the virtual objects.

The display 100 is one selected from a group including but not limited to: liquid crystal display (LCD), flexible organic liquid crystal display (OLCD), non-flexible OLCD, liquid crystal on silicon (LCOS), ferroelectric liquid crystal on silicon (FLCOS), or a combination thereof.

In specific examples, the variable focus lens 110 is a lens whose strength changes under mechanical or electrical conditions. The variable focus lens 110 is one selected from a group including but not limited to: a liquid crystal, liquid flexing lens, Alvarez lens, or a combination thereof. In other non-limiting examples, the variable focus lens 110 is a lens having an ability to change its focal length.

A visual combiner 120 is a mirrored surface which can change reflectivity through electrical stimulation or physical modification. In multiple examples, the visual combiner 120 can change its reflectivity from fully reflective to semi-transparent to transparent on a pixel by pixel basis.

Figure 1B:
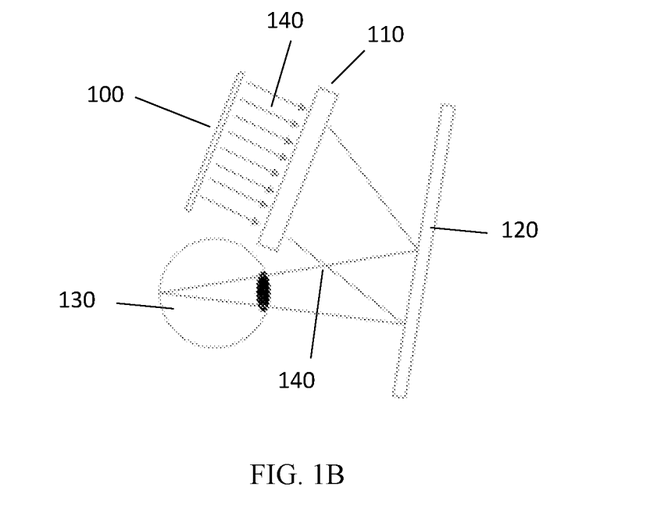
FIG. 1B illustrates a pathway of light rays between a display, a variable focus lens, and a visual combiner configured according to one embodiment of the invention.

FIG. 1B shows an exemplary pathway of light 140 between a display 100, a variable focus lens 110 positioned at the exit pupil of the display 100, and a visual combiner 120 positioned at the exit pupil of the variable focus lens 110. This design optimizes the definition of virtual content 210 without compromising the focus on reality.

Figure 2:
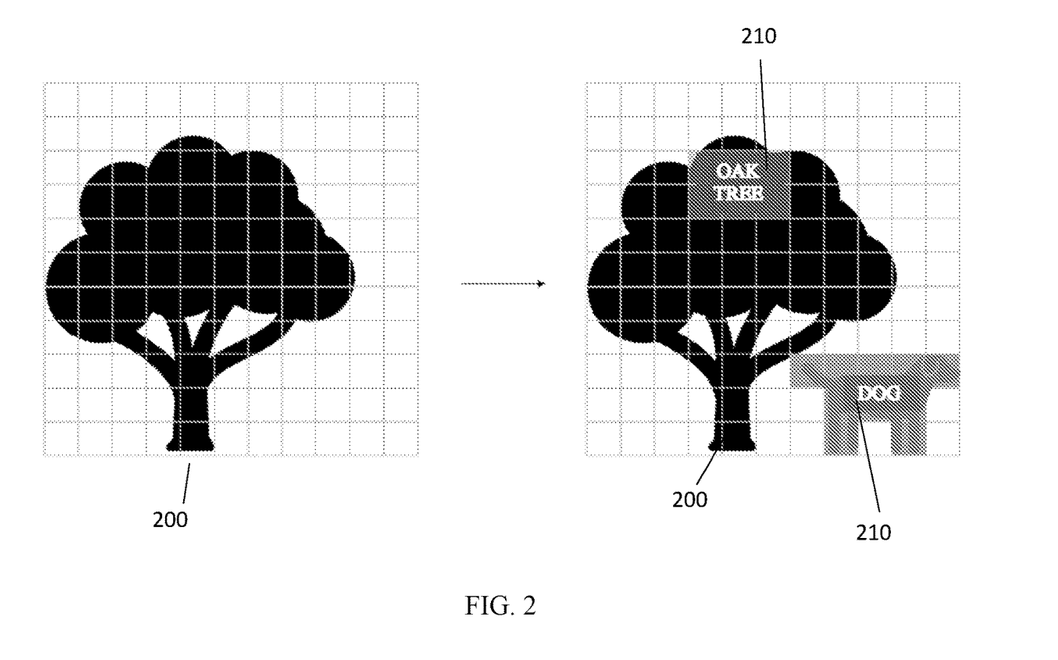
FIG. 2 illustrates a schematic example of a mixed reality perception of AR, VR, and the combination of mixed reality.

FIG. 2 schematizes a mixed reality perception of AR, VR, and the combination of mixed reality. One major benefit over the prior art is that the invention can act in the three main capacities involving AR, VR, and the mixed reality combination thereof. The first image in FIG. 2 depicts an instance where the physical world 200, i.e. the tree, is viewed through a mixed reality system, where the visual combiner 120 is transparent and the physical world 200 is visible and virtual content 210, i.e. the dog and "Oak Tree" label, is not reflected to the user's eye 130. In another instance (not pictured in FIG. 2), the mixed reality system functions as a VR headset, wherein the pixels of the visual combiner 120 are fully reflective, resulting in the physical world 200 no longer being visible and virtual content 210 is visible. In in the second image of FIG. 2, at a fixed focus the mixed AR system functions as a head up display, wherein the physical world 200 is continuously visible and the virtual content 210 is in focus to at least one depth. In other instances, at variable focus and reflectivity the mixed AR system enables access and utility of applications in all existing user spaces (e.g., VR and AR) in real time in the physical world. In specific examples of the invention the display behavior contains the novel features.

Figure 3:
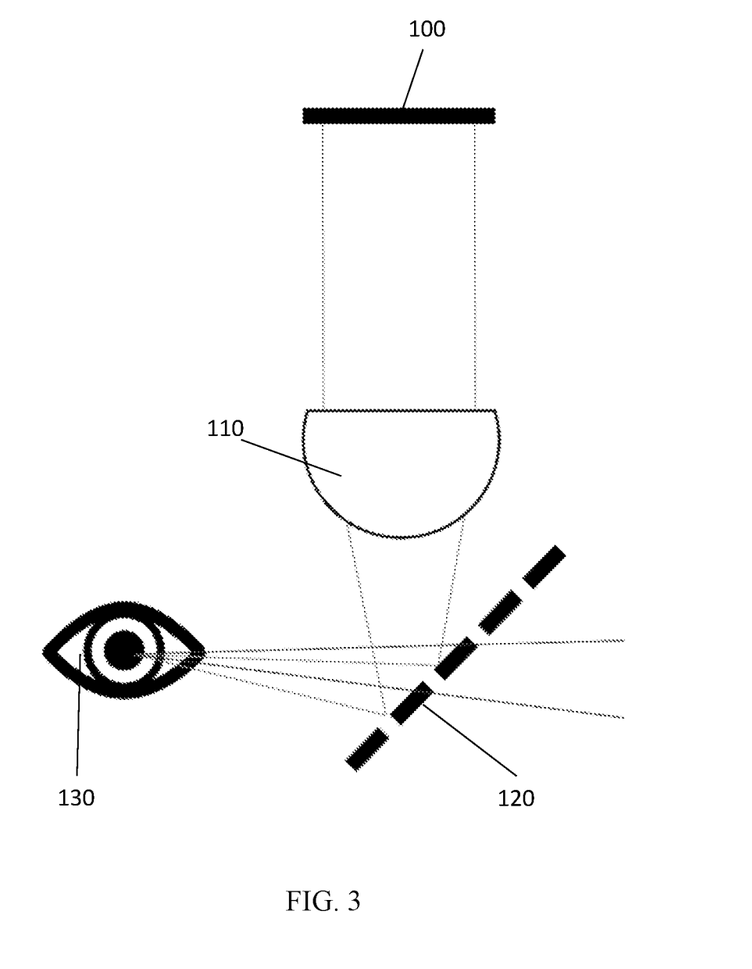
FIG. 3 illustrates a mixed reality system including a display, a variable focus lens, and a visual combiner in a configuration according to one embodiment of the invention.

FIG. 3 shows a mixed reality system in one configuration including a display 100, a variable focus lens 110 positioned at the exit pupil of the display 100, and a visual combiner 120 positioned at the exit pupil of the variable focus lens 110 and in front of a user's eye 130. In specific examples, the display 100 is one selected from a group consisting of: LCD, OLCD, LCOS, FLCOS, or a combination thereof. Preferably, the variable focus lens 110 is capable of changing its focal length. In one embodiment, the range of the focal length of the variable focus lens 110 would be 0 D to +3.5 D or −3.5 D to 0 D. In other non-limiting examples, a larger or smaller range of the focal length of the variable focus lens 110 would not depart from the spirit and scope of the invention. In multiple examples, the variable focus lens 110 is one selected from a group consisting of: a liquid crystal, liquid flexing lens, Alvarez lens, or a combination thereof. In certain instances, the visual combiner 120 is a polarized surface, a partial mirror, or a combination thereof. In other instances, the visual combiner 120 is a semi-transparent surface.

According to various examples, the mixed reality system includes a head mounted portion which houses the display 100, the variable focus lens 110, and the visual combiner 120.

In certain examples, the mixed reality system includes at least a pair of cameras located within the inner side of the head mounted portion. In particular, the pair of cameras are positioned such that at least one camera is located about each side of a nose bridge to track a user's pupil. Pupil tracking using cameras enables any software controlling the head mounted portion to determine a focal point and a focal depth of a user's eye. In specific examples, cameras are used in combination with other user facing cameras to read user expressions and provide feedback to any component of the mixed AR system on how to improve integration of a virtual object in physical space and vice versa. In certain examples, the head mounted portion includes a plurality of sensors to determine the absolute orientation of a user's head. Alternatively, such sensors are used in combination with any one selected from a group including, but not limited to: accelerometers, gyroscopes, and magnetometers. Additionally, sensors are used to determine a depth to an object located in front of a user. Examples of sensors include but are not limited to: infrared sensors (e.g., long-range IR) or cameras. In preferred examples, the mixed reality system includes at least one sensor that determines a real-world luminance and adjusts a virtual world luminance on the display 100 until a brightness level is comparable to a perceived real-world luminance.

In some examples, the head mounted portion includes at least a pair of speakers or at least a pair of headphones positioned bilaterally on a user's head to provide stereoscopic audio perception. Additionally, the head mounted portion includes at least one microphone to receive voice to text communication. Furthermore, software processes inputs from sensors, microphones, speakers, etc. in order to render a virtual space.

Figure 4:
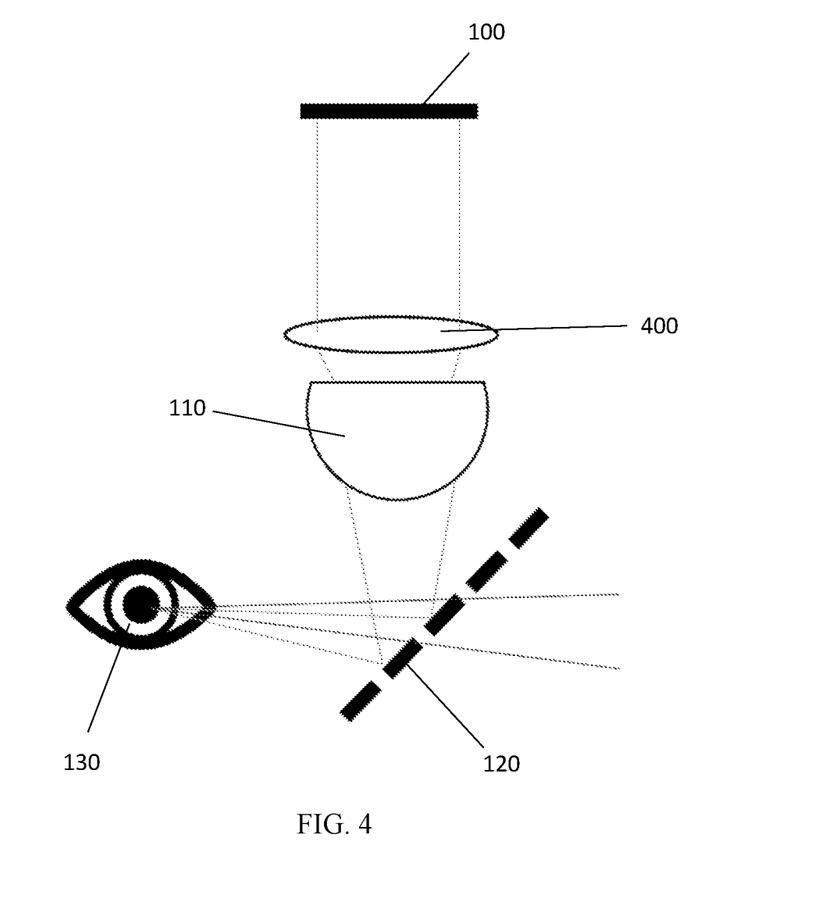
FIG. 4 illustrates a mixed reality system including a display, a fixed focus lens positioned at the entrance pupil of a variable focus lens and a visual combiner in configuration according to another embodiment of the invention.

A possible limitation is that one variable focus lens alone will not be able to provide a strong enough focal length to render a near-eye image at optical infinity. The invention overcomes this limitation by including an additional lens, one or more light directing devices, or a combination thereof to increase the focal length of an image before the image passes through a variable focus lens. In specific examples, the one or more light directing devices is a mirror, a prism, and a combination thereof. FIG. 4 illustrates a mixed reality system including a display 100, a variable focus lens 110 positioned at the exit pupil of the display 100, a fixed focus lens 400 positioned at the entrance pupil of the variable focus lens 110, and a visual combiner 120 positioned in front of a user's eye 130. Alternatively, the fixed focus lens 400 is positioned at the exit pupil of the variable focus lens 110. Further in another example, the fixed focus lens 400 is a convex lens. In certain examples, the invention has one or more fixed focus lenses 400 to modify the initial focal length of the system. In other examples, the invention has one or more variable focus lenses 110 to modify the initial focal length of the system. In one embodiment, the focal length range of the variable focus lens is −1 D to +1 D when combined with a fixed focal length lens 400. In other non-limiting examples, a larger or smaller range of the focal length of the variable focus lens 110 would not depart from the spirit and scope of the invention.

Figure 5:
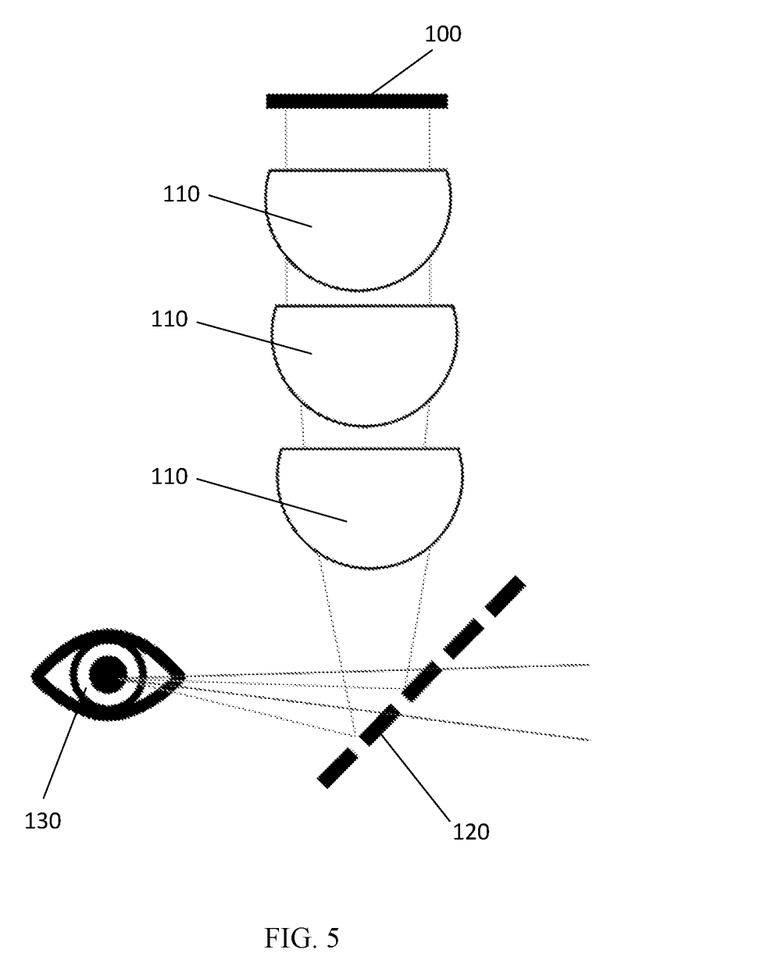
FIG. 5 illustrates a mixed reality system including a display, one or more variable focus lenses positioned in series, and a visual combiner in a configuration according to multiple embodiments of the invention.

Another solution to compensate for the limited focal length is to use multiple variable focus lenses in tandem. FIG. 5 shows a mixed reality system having a display 100, one or more variable focus lens 110 positioned in a series at the exit pupil of the display 100, and a visual combiner 120 positioned at the exit pupil of the one or more variable focus lens 110. Using a series of variable focus lenses 110, e.g. two or more, focuses an image further than if using a single variable focus lens 110. In other non-limiting examples, the one or more variable focus lenses 110 positioned in another configuration would not depart from the spirit and scope of the invention.

Figure 6:
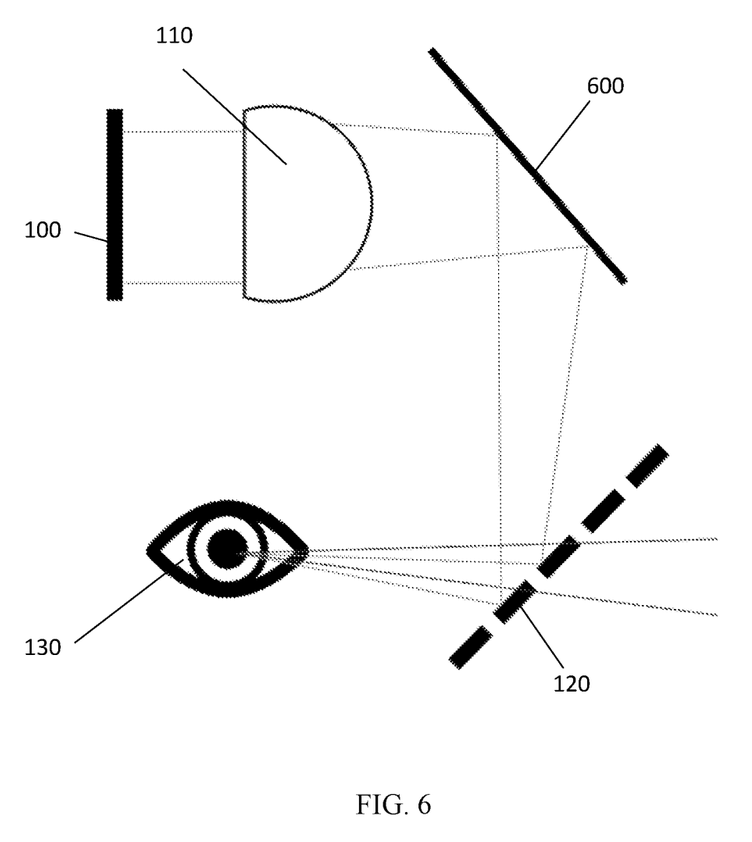
FIG. 6 illustrates a mixed reality system including a display, a variable focus lens, one or more mirrors positioned at the exit pupil of the variable focus lens, and a visual combiner in a configuration according to one embodiment of the invention.

In various examples of the mixed reality system the visual combiner 120 is a semi-reflective controllable surface. In specific examples, the semi-reflective surface comprises a glass or plastic material. Preferably, the semi-reflective surface has a pixel-by-pixel controllable surface that can change its appearance from transparent to opaque. FIG. 6 illustrates a mixed reality system including a display 100, a variable focus lens 110 positioned at the exit pupil of the display 100, one or more light directing devices positioned at the exit pupil of the variable focus lens 110, and a visual combiner 120 positioned in front of a user's eye 130. Alternatively, the one or more light directing devices are positioned at the entrance pupil of a variable focus lens 110, wherein the one or more light directing devices are positioned in a configuration to redirect the virtual content 210 for i) increasing the focal length of the virtual content 210 and ii) allowing alternative placements of the mixed reality system in relation to a user's eye 130. In specific examples, the one or more light directing devices is one or more mirrors 600, a prism 700, and a combination thereof. In specific examples, the one or more mirrors 600 is/are flat or sculpted.

In multiple examples, the head mounted portion has an outer surface coating to provide a one-way privacy screen and prevent others from viewing the blocked pixels on the display 100 and learning information about the use of the mixed reality system. Alternatively, the head mounted portion has an outer surface lens to provide similar one-way privacy and pixel blocking as described.

In certain examples, the invention is used in combination with a smart device (e.g., a smartphone) or another display.

Figure 12:
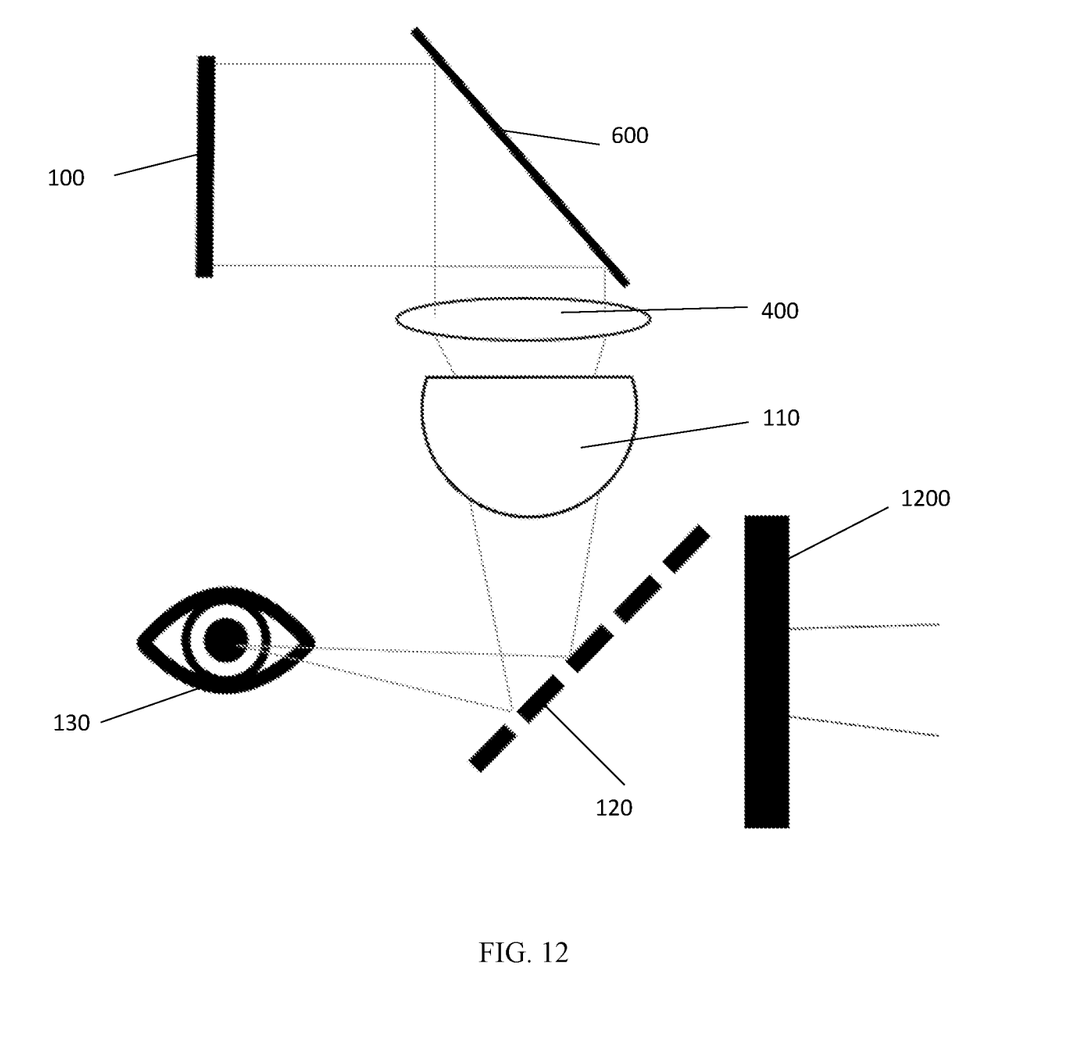
FIG. 12 illustrates a mixed reality system including a display, one or more mirrors, a fixed focus lens at the exit pupil of the mirrors, a variable focus lens, a visual combiner, and a removable opaque surface.

In specific examples, the visual combiner 120 is a semi-transparent surface with a removable opaque cover, similar to an interrogation window in lieu of a semi-reflective surface with a pixel-by-pixel controllable surface. A removable opaque 1200 cover permits the user of the mixed reality system to switch between AR and VR when the removable opaque cover is positioned at the entrance pupil of the visual combiner 120. Using a removable opaque cover 1200 absorbs light and/or blocks any light from the real world from entering into the mixed reality system through the visual combiner 120.

In various examples, the mixed reality system includes a display-to-lens-to-visual combiner 120 configuration with any relative distance between each component in the mixed reality system and any relative angle above a user's eye 130, lateral to a user's eye 130, or below a user's eye 130 (the latter if a display is powerful enough).

In various examples, the display 100, the variable focus lens 110, and the one or more mirrors 600 is/are positioned to improve a user's experience and field of view. In certain instances, the display 100 is flat. Alternatively, the display 100 has another sculpted form. In certain examples, the variable focus lens 110 is flat or sculpted.

Figure 7:
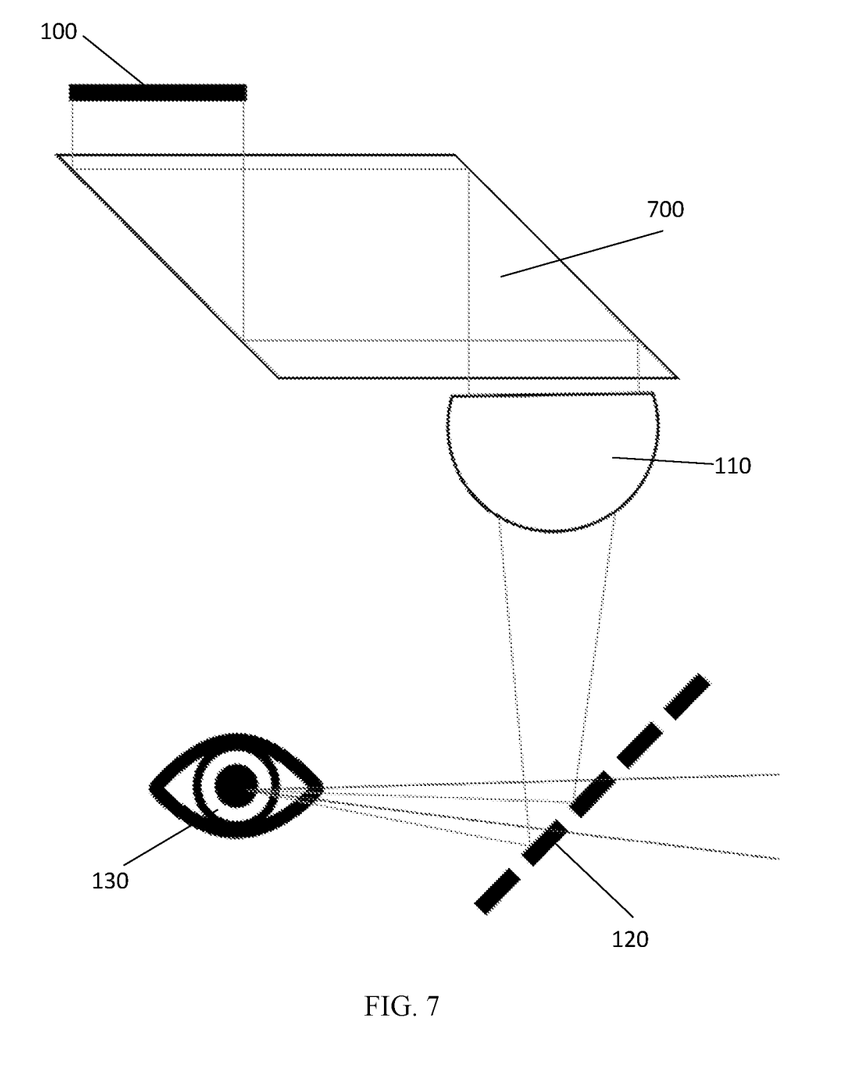
FIG. 7 illustrates a mixed reality system including a display, a prism positioned at the exit pupil of the display, a variable focus lens positioned at the exit pupil of the prism, and a visual combiner in a configuration according to one embodiment of the invention.

FIG. 7 shows a mixed reality system including a display 100, a light directing device positioned at the entrance pupil of a variable focus lens 110, and a visual combiner 120 positioned in front of a user's eye 130. In specific examples, the one or more light directing devices is a mirror 600, a prism 700, and a combination thereof. In another example, one or more prisms 700 is/are positioned at the exit pupil of a variable focus lens 110. In yet another example, one or more prisms 700 is/are positioned in a configuration to redirect virtual content 210 for i) increasing the focal length of the virtual content 210 and ii) allowing alternative placements of the mixed reality system in relation to a user's eye 130.

Figure 8:
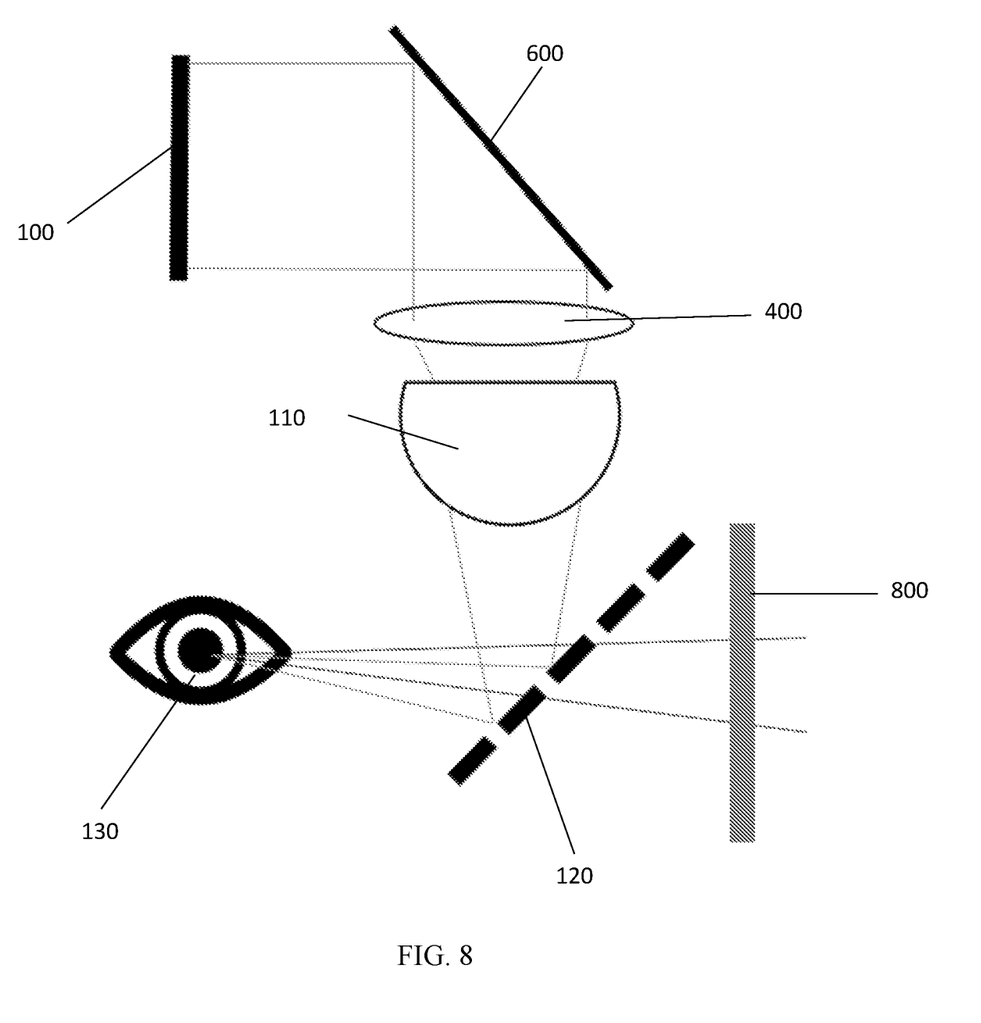
FIG. 8 illustrates a mixed reality system including a display, one or more mirrors positioned at the exit pupil of the display, a fixed focus lens, a variable focus lens, a visual combiner, and a tinted or polarized lens positioned at the entrance pupil of the visual combiner in a configuration according to multiple embodiments of the invention.

FIG. 8 illustrates a mixed reality system including a display 100, one or more mirrors 600 positioned at the exit pupil of the display 100, a fixed focus lens 400 positioned at the exit pupil of the one or more mirrors 600, a variable focus lens 110 positioned at the exit pupil of the fixed focus lens 400, a visual combiner 120 positioned in front of a user's eye 130, and a tinted or polarized lens 800 positioned at the exit pupil of the visual combiner 120. A tinted or polarized lens 800 provides user privacy and blocks excessive outside light from entering the mixed AR system. Further in various examples, the tinted or polarized lens 800 is used for aesthetic purposes. In another example, the one or more mirrors 600, is/are a prism 700.

Figure 9:
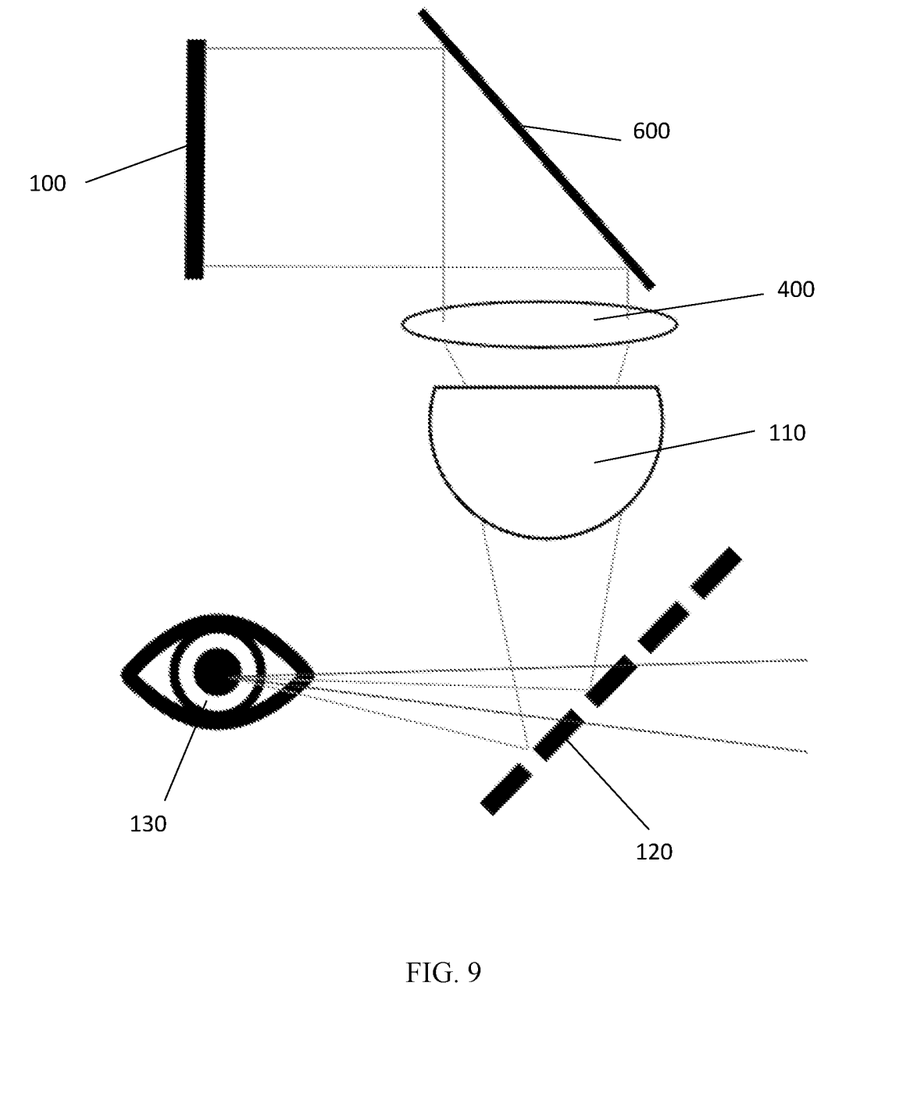
FIG. 9 illustrates a mixed reality system including a display, one or more mirrors positioned at the entrance pupil of a convex lens positioned at the entrance pupil of a variable focus lens, and a visual combiner in a configuration according to one embodiment of the invention.

FIG. 9 illustrates a mixed reality system including a display 100, one or more mirrors 600 positioned at the exit pupil of the display 100, a fixed focal length lens 400 positioned at the entrance pupil of a variable focus lens 110, and a visual combiner 120 positioned in front of a user's eye 130. In another example, the one or more mirrors 600, is a prism 700.

Figure 10:
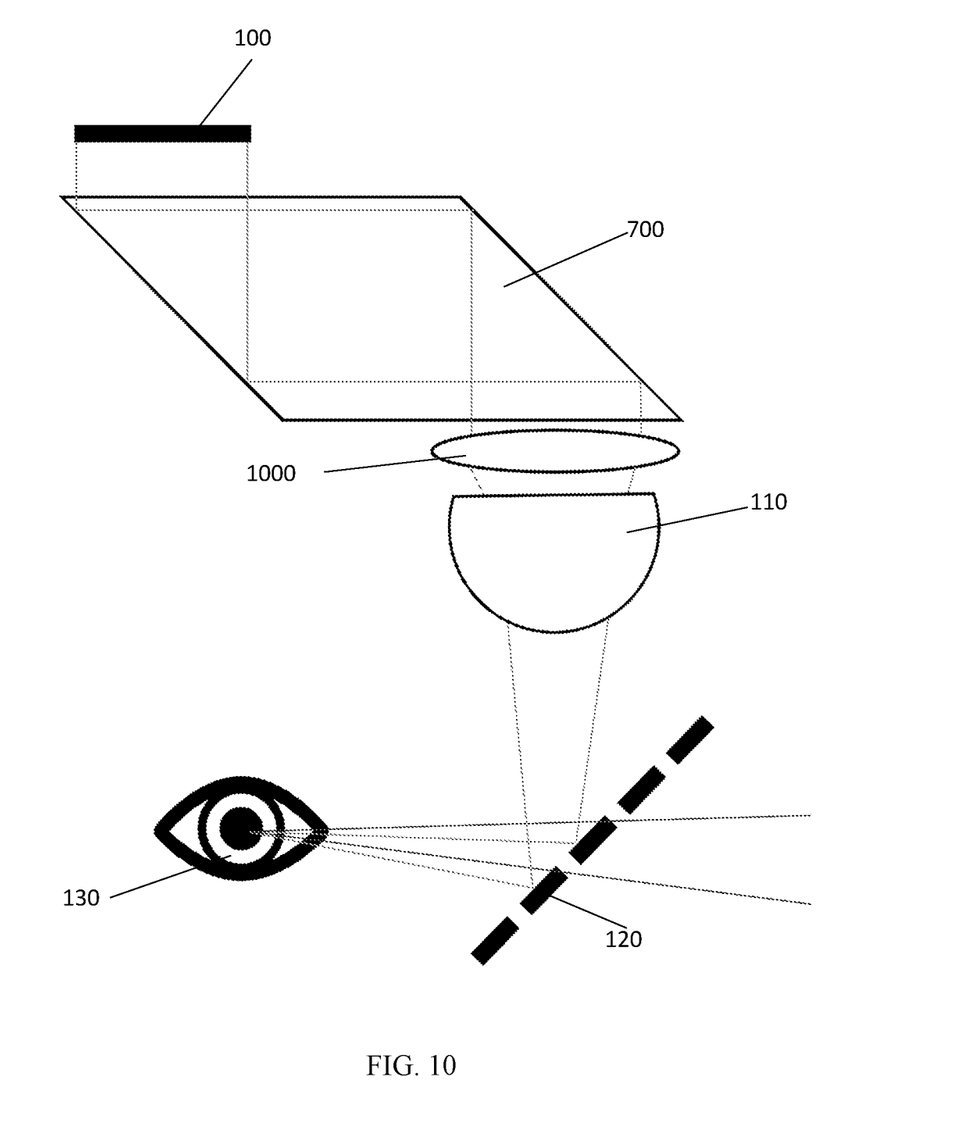
FIG. 10 illustrates a mixed reality system including a display, a convex lens positioned at the entrance pupil of a variable focus lens, a prism positioned at the entrance pupil of the convex lens and the variable focus lens, and a visual combiner in a configuration according to one embodiment of the invention.

FIG. 10 illustrates a mixed reality system including a display 100, a one or more prisms 700 positioned at the exit pupil of the display 100, a convex lens 1000 positioned at the exit pupil of one or more prisms 700, a variable focus lens 110 positioned at the exit pupil of the convex lens 1000, and a visual combiner 120 positioned in front of a user's eye 130. In another example, the one or more prisms 600, is/are a mirror 600.

Figure 11:
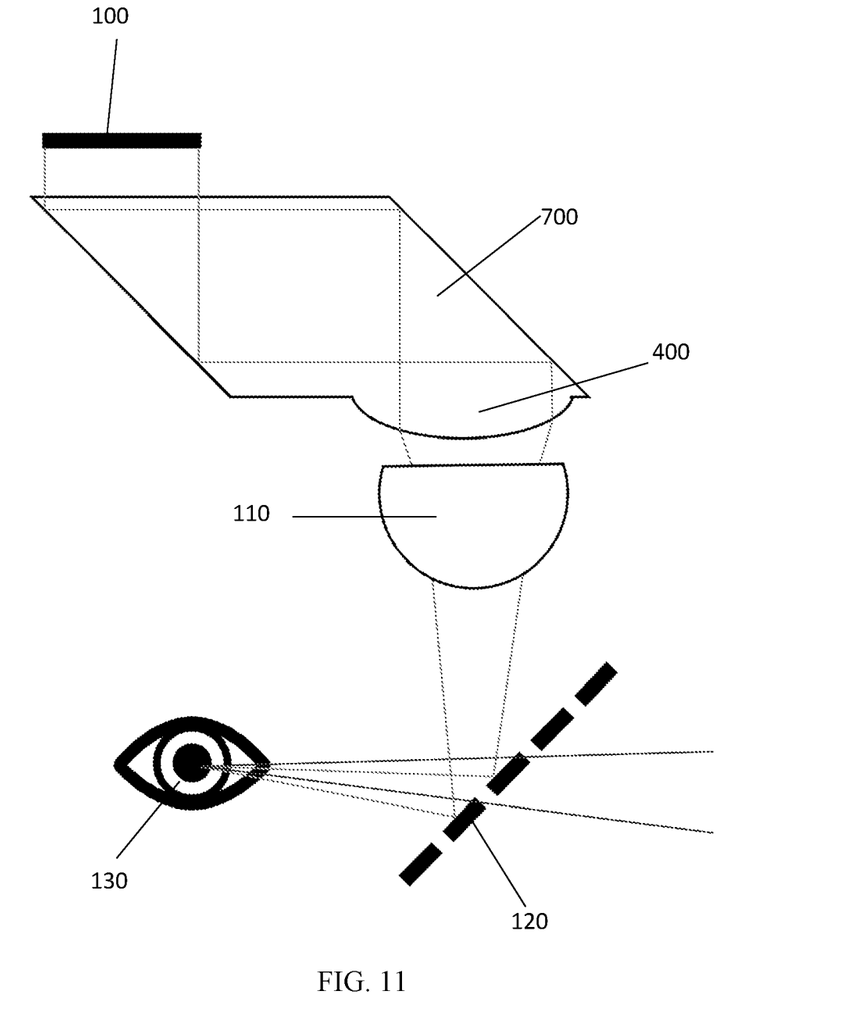
FIG. 11 illustrates a mixed reality system including a display, a variable focus lens, a prism with a focusing edge positioned at the entrance pupil of a variable focus lens, and a visual combiner in a configuration according to one embodiment of the invention.

FIG. 11 shows a mixed reality system including a display 100, one or more prisms 700 positioned at the exit pupil of the display 100, a fixed focal lens 400 positioned at a first end of the one or more prisms 700, wherein the fixed focus lens 400 is positioned at the entrance pupil of a variable focus lens 110, and a visual combiner 120 positioned at the exit pupil of the variable focus lens 110 and in front of a user's eye 130. In certain examples, the one or more prisms 700 comprises a glass material. In specific examples, the one or more prisms 700 is a focal lengthener, a fixed focal length lens, and a combination thereof.

FIG. 12 shows a mixed reality system including a display 100, one or more mirrors 600 positioned at the exit pupil of the display 100, a fixed focal lens 400 positioned at a first end of the one or more prisms 700, wherein the fixed focus lens 400 is positioned at the entrance pupil of a variable focus lens 110, and a visual combiner 120 positioned at the exit pupil of the variable focus lens 110 and in front of a user's eye 130. Alternatively, the one or more mirrors 600 is/are positioned at the exit pupil of the variable focus lens and the entrance pupil of the visual combiner 120. In certain examples, the one or more mirrors 600 is/are position at both: (1) the exit pupil of the display 100 and the entrance pupil of the fixed focus lens 400, and (2) the exit pupil of the variable focus lens and the entrance pupil of the visual combiner. In specific examples, the visual combiner 120 is a semi-transparent surface with a removeable opaque surface 1200.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A mixed reality system comprising:
   a display positioned relative to a user's eye;
   at least one variable focus lens positioned at an exit pupil of the display;
   a visual combiner positioned at an exit pupil of the at least one variable focus lens and in front of a user's eye; and
   at least one fixed focus lens positioned at an entrance pupil of the variable focus lens, wherein the at least one variable focus lens is positioned at an exit pupil of the at least one fixed focus length lens.

2. The mixed reality system of claim 1, wherein the visual combiner is a semi-reflective controllable surface.

3. The mixed reality system of claim 1, wherein the at least one fixed focus lens is positioned at the exit pupil of the at least one variable focus lens;
   and wherein the at least one visual combiner is positioned at the exit pupil of the at least one fixed focus lens and in front of the user's eye.

4. The mixed reality system of claim 3, wherein the at least one fixed focus lens is a convex lens.

5. The mixed reality system of claim 1, further comprising:
   at least one light directing device positioned at the exit pupil of the display and an entrance pupil of the at least one fixed focus lens; and wherein the at least one fixed focus lens is positioned at an exit pupil of the at least one light directing device and the entrance pupil of the variable focus lens.

6. The mixed reality system of claim 5, wherein the at least one light directing device is selected from the group consisting of: a mirror, a prism, and a combination thereof.

7. The mixed reality system of claim 5, wherein the at least one light directing device is positioned at the exit pupil of the variable focus lens and an entrance pupil of the visual combiner; and wherein the at least one fixed focus lens is positioned at the exit pupil of the display and the entrance pupil of the variable focus lens.

8. The mixed reality system of claim 7, wherein the at least one light directing device is selected from the group consisting of: a mirror, a prism, and a combination thereof.

9. The mixed reality system of claim 5, further comprising:
   a lens positioned at an entrance pupil of the at least one visual combiner; and wherein the lens is tinted or polarized.

10. The mixed reality system of claim 1, wherein the visual combiner is a semi-transparent surface comprising:

a removable opaque cover positioned at the entrance pupil of the visual combiner.

11. The mixed reality system of claim 1, further comprising: at least one prism comprising a first end and a second end, wherein the first end of the prism is positioned at the exit pupil of the display; at least one fixed focus lens positioned at the second end of the at least one prism, wherein the fixed focus lens is positioned at the entrance pupil of the at least one variable focus lens; and wherein the at least one variable focus lens is positioned at the exit pupil of the at least one fixed focal length lens.

12. The mixed reality system of claim 11, wherein the at least one prism is selected from the group consisting of: a focal lengthener, a fixed focal length lens, and a combination thereof.

13. The mixed reality system of claim 1, in which the display is selected from the group consisting of: liquid crystal display (LCD), flexible organic liquid crystal display (OLCD), non-flexible OLCD, liquid crystal on silicon (LCOS), and ferroelectric liquid crystal on silicon (FLCOS).

14. The mixed reality system of claim 1, further comprising: at least a pair of cameras positioned near the user's eye, wherein the at least a pair of cameras tracks a user's pupil to determine a focal point and a focal depth of the user's eye.

15. A method for adjusting the focus of a digital image as the depth of both digital and real objects vary using a mixed reality system, comprising: presenting, using a display, the digital image through at least one variable focus lens; reflecting the digital image off of a variable reflective mirror into the user's eye;
controlling, using the variable reflective mirror, a viewable space to pass the real objects through the mixed reality system; and
condensing, using at least one variable focus lens, at least one ray of the digital image to control the perceived depth of the virtual object.

16. A method for adjusting the focus of a virtual image to match the focus of a real world object as the human eye varies its focal point, comprising:
projecting a virtual image from a display onto a variable focus lens;
determining, using tracking data collected from a camera, a focal point and a focal depth of the human eye viewing the real world object;
adjusting the variable focus lens, using the focal point and the focal depth of the human eye, to match the focus of the virtual image with the focus of the real world object; and
adjusting a transparent quality of a variable reflective mirror to change whether the real world objects are viewable to the human eye.

17. The method of claim 16, further comprising:
reflecting the virtual image from the variable focus lens onto the variable reflective mirror; and
reflecting the virtual image from the variable reflective mirror onto a visual combiner to
combine the real world object and the virtual image.

* * * * *